United States Patent
Hagiwara

(10) Patent No.: US 6,908,231 B2
(45) Date of Patent: Jun. 21, 2005

(54) ROLLING BEARING UNIT FOR A DRIVE WHEEL AND A WHEEL DRIVING UNIT

(75) Inventor: Nobuyuki Hagiwara, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/173,973

(22) Filed: Jun. 19, 2002

(65) Prior Publication Data
US 2003/0002761 A1 Jan. 2, 2003

(30) Foreign Application Priority Data

Jun. 20, 2001 (JP) ........................................ 2001-187048
Oct. 31, 2001 (JP) ........................................ 2001-334345

(51) Int. Cl.[7] ............................................. F16C 19/08
(52) U.S. Cl. ..................................... 384/537; 384/544
(58) Field of Search ................................. 384/537, 544, 384/589, 585, 543

(56) References Cited

U.S. PATENT DOCUMENTS 5,490,732 A 2/1996 Hofmann et al.
6,422,758 B1 * 7/2002 Miyazaki et al. ........... 384/544
6,485,188 B1 * 11/2002 Dougherty ................... 384/589

FOREIGN PATENT DOCUMENTS

| EP | 0854303 | 7/1998 |
| EP | 0 992 698 A2 | 4/2000 |
| EP | 1063437 | 12/2000 |
| EP | 1 129 868 A2 | 9/2001 |
| JP | 2000-087979 | 3/2000 |

* cited by examiner

Primary Examiner—Lenard A. Footland
(74) Attorney, Agent, or Firm—Crowell & Moring LLP

(57) ABSTRACT

A rolling bearing unit for a drive wheel comprises a hub and a double row rolling bearing thereon. The hub has a first inner ring raceway formed on an inner ring element integrally or separately formed with the hub in an intermediate portion, and a fit cylindrical surface section in a part closer to the inner end of the outer peripheral surface. A separate inner ring having a second inner ring raceway is fitted on the hub, with the axially inner end surface pressed by a caulking portion formed by plastically deforming a cylindrical section formed in the axially inner end portion of the hub in a state that the inner ring is fitted on the fit cylindrical surface section, to be fixed to the hub.

2 Claims, 11 Drawing Sheets

ROLLING BEARING UNIT FOR A DRIVE WHEEL AND A WHEEL DRIVING UNIT

This application claims the benefit of Japanese Patent Applications No. 2001-187048 and No. 2001-334345 which are hereby incorporated by reference.

BACKGROUND OF THE INVENTION

1. Field of the Invention

The present invention relates to a rolling bearing unit for a drive wheel of an automobile and a wheel driving unit.

The rolling bearing unit for a drive wheel of an automobile and the wheel driving unit according to the present invention are adapted to support a drive wheel to be supported by a suspension device of an independent type, which wheel includes the front wheel of an FF car (a front wheel drive car with a front engine), the rear wheel of an FR car (a rear wheel drive car with a front engine) and an RR car (a rear wheel drive car with a rear engine) and the all wheels of a 4WD car (a four wheel drive car), to be rotatable with respect to the suspension device, and are used for rotating and driving the above drive wheel.

2. Related Background Art

In order to support the wheel to be rotatable with respect to the suspension device, there are used various kinds of rolling bearing units for a drive wheel in which an outer ring or race and an inner ring or race are combined together to be rotatable through rolling elements. Also, a rolling bearing unit for a drive wheel which is adapted to support the drive wheel with the independent type suspension and to rotate and drive this drive wheel is required to have a structure which can be connected to a wheel side constant velocity joint. This wheel side constant velocity joint is required for transmitting a rotation of a transmission shaft for transmitting a drive force to the above drive wheel smoothly (maintaining uniform speed), irrespective of displacement of the drive wheel or a steering angle applied to this drive wheel. FIG. 7 shows a structure which is normally embodied according to the prior art, in which a rolling bearing unit 1 for the drive wheel and a wheel side constant velocity joint 2 are combined with each other for such a purpose.

In this structure, the rolling bearing unit 1 for the drive wheel comprises an outer ring 3, and a hub 4 and an inner ring 5 which are rotatably supported on the inner diameter side of the outer ring 3 through a plurality of rolling elements 6, 6. Out of these members, the outer ring 3 is connected and fixed to a knuckle (not shown) for constituting a suspension device by the use of a first flange 7 disposed on the outer peripheral surface thereof and is not rotated even when it is used. Also, on the inner peripheral surface of the outer ring 3, there are provided a pair of outer ring raceways 8, 8, so as to rotatably support the hub 4 and the inner ring 5 on the inner diameter side of this outer ring 3 coaxially with the outer ring 3.

Out of these members, the hub 4 is provided with a second flange 9 for supporting the wheel at a position closer to the outer edge of the outer peripheral surface. (The outer side with respect to or in the axial direction indicates the outer side in the width direction of the vehicle when it is assembled in the car and the left side in the drawings except FIG. 4. This will be the same in the entire present specification.) A first inner ring raceway 10 is formed in an intermediate inner ring element portion on the outer peripheral surface of the hub 4. The inner ring 5 which is formed with a second inner ring raceway 12 on the outer peripheral surface thereof is fitted and fixed on a small diameter stepped portion 11 corresponding to a fit cylindrical section formed at an axially inner end of the same outer peripheral surface. (The inner side with respect to or in the axial direction indicates the inner side in the width direction of the vehicle when it is assembled in the car and the right side in the drawings except FIG. 4. This will be the same in the entire present specification.) In addition, in the center of the hub 4, a spline hole 13 is provided.

On the other hand, the wheel side constant velocity joint 2 described above comprises a constant velocity joint outer ring 14, a constant velocity joint inner ring 15, a plurality of balls 16, 16, and a spline shaft 17. The constant velocity joint outer ring 14 is formed in the axially inner end portion of this spline shaft 17 coaxially with this spline shaft 17. Outer engagement grooves 18, 18 are formed at a plurality of positions in the circumferential direction of the inner peripheral surface of such a constant velocity joint outer ring 14, respectively in a direction perpendicular to this circumferential direction. The constant velocity joint inner ring 15 is provided with a second spline hole 19 in the center thereof and inner engagement grooves 20, 20 at positions which are corresponding to the outer engagement grooves 18, 18 on the outer peripheral surface thereof, respectively in a direction perpendicular to the circumferential direction. Then, the balls 16, 16 described above are disposed respectively between the inner engagement grooves 20, 20 and the outer engagement grooves 18, 18 to be rotatable along these engagement grooves 20, 18 in a state that they are held by a retainer 21. The shapes, and the like, of the constituent parts of the constant velocity joint 2 are the same as those of a known constant velocity joint of a Rzeppa type or a Birfield type.

The wheel side constant velocity joint 2 and the rolling bearing unit 1 for the drive wheel as described above are assembled to each other by inserting the spline shaft 17 into the spline hole 13 of the hub 4 mentioned above outward from inside thereof, and then bringing a nut 23 into threadable engagement with a male screw portion 22 which is formed in a part protruded from the outer end surface of the hub 4 at the axially outer end portion of the spline shaft 17 to be further tightened. In this state, the axially inner end surface of the inner ring 5 is contacted with the axially outer end surface of the constant velocity joint outer ring 14, so that this inner ring 5 is not displaced in a direction to be removed from the small diameter stepped portion 11 by any means. At the same time, an appropriate preload is applied onto the rolling elements 6, 6.

Further, in a state of being assembled in the suspension device of the car, a male spline portion 25 which is provided in the axially outer end portion of the transmission shaft 24 is brought into spline engagement with the second spline hole which is provided in the center of the constant velocity joint inner ring 15, so that this transmission shaft 24 is coupled with the constant velocity joint inner ring 15 to transmit a rotating force therebetween. Also, the axially inner end portion of this transmission shaft 24 is coupled and fixed to the central part of a trunnion 27 (see FIG. 12) which serves as an output unit of a constant velocity joint 26 of a tripod type which is provided in an output shaft portion of a differential gear. As a result, the transmission shaft 24 is rotated at a constant velocity when the car is running.

Disclosed in the Japanese Patent Application Laid-Open No. 11-5404 is a structure that an inner ring 5 which is fitted on the small diameter stepped portion 11 in the axially inner end portion of a hub 4a is pressed against a stepped surface 29 of the small diameter stepped portion 11 with a caulking portion 28 which is formed by caulking and expanding outward in the radial direction a cylindrical section existing in a part more protruded inward than the inner ring 5, as shown in FIG. 8. In case of this second example of the conventional structure, preload is applied onto each of the rolling elements 6, 6 with the pressing force exerted by the caulking portion 28. Note that, in case of the structure disclosed in the above laid-open application, like in the first example of the conventional structure described above, a rolling bearing unit 1*a* for the drive wheel and a wheel side constant velocity joint 2 are coupled to each other by bringing the male screw portion 22 which is provided in the outer end portion of the spline shaft 17 into threadable engagement and tight fitting with the nut 23. A similar structure is also disclosed in the Japanese Patent Application Laid-Open No. 2000-87979.

However, as shown in FIG. 8, in the structure that the caulking portion 28 is used to fix the inner ring 5 with respect to the hub 4*a*, the preload application onto the rolling elements 6, 6 is completed when this caulking portion 28 is formed. Accordingly, it is also possible to omit the male screw portion 22 and the nut 23 so as to reduce the size and the weight of the rolling bearing unit for driving the wheel which is comprised of a wheel driving rolling bearing unit and a wheel side constant velocity joint coupled to each other. FIG. 9 shows one example of a wheel driving rolling bearing unit 30, arranged from this angle.

In this wheel driving rolling bearing unit 30, it is arranged to prevent a spline shaft 17 which is inserted in a spline hole 13 formed in the center of the hub 4*a* from being drawn therefrom by the use of a stop ring 31 formed of an elastic material. To this end, an outer locking portion such as a locking stepped portion 32 is disposed in the axially outer end portion of the spline hole 13, and an inner locking portion such as a locking groove 33 is formed on the outer peripheral surface of the axially outer end portion of the spline shaft 17, respectively. Then, the stop ring 31 which is formed of a wire rod of spring steel in a split ring shape with a split at a portion thereof and whose diameter is elastically expandable or contractible is extended over between the locking stepped unit 32 and the locking groove 33. As described above, it is possible to reduce the size and the weight of the rolling bearing unit 30 for driving the wheel by using the structure in which the spline shaft 17 is prevented from being drawn out from the spline hole 13 by the stop ring 31 and a rolling bearing unit 1*b* for the drive wheel is coupled to the wheel side constant velocity joint 2 to each other, so that the male screw portion and the nut may be omitted.

Also disclosed in U.S. Pat. No. 5,490,732 is a structure that the inner ring 5*a* which is fitted on the small diameter stepped portion in the axially inner end portion of a hub 4*c* is pressed against a stepped surface of the small diameter stepped portion by the use of the caulking portion 28 which is formed by caulking and expanding outward in the radial direction a cylindrical section existing in a part more protruded inward than the inner ring 5*a*, as shown in FIG. 10. In case of this disclosed structure, the hardness of the caulking and the dimensions of each constituent parts to allow the caulking work are specified. Note that, in the above patent publication, there is also disclosed a drawing in which a boarder position between a thicker cylindrical section and a thinner cylindrical section on the axially inner end portion of the hub 4*c* is positioned more outward in the axial direction than the axially outer end position of a chamfered portion which is formed on the inner ring fixed to the hub at a point of intersection between the inner peripheral surface with the axially inner end surface suppressed by the caulking portion. However, in this patent publication, a structure having a spline at the center of the hub is not disclosed and the dimensions of each of the constituent parts of the hub for minimizing the contraction of a female spline at the axially inner end of the hub due to the caulking are not specified.

Also, disclosed in European Patent No. 1063437 is a structure that the inner ring 5 which is fitted on the small diameter stepped portion on the axially inner end portion of a hub 4*d* is pressed against the stepped surface of the small diameter stepped portion by the use of a caulking portion 28 which is formed by caulking and expanding outward in the radial direction a cylindrical section existing in a part more protruded outward than the inner ring 5, as shown in FIG. 11. In this publication, the position at which the caulking work of the hub 4*d* starts is located more outward in the axial direction than the axially outer end position of the chamfered portion which is formed at a point of intersection between the inner peripheral surface of the inner ring 5 fixed to the hub 4*b*, with the axially inner end surface of the inner ring 5 suppressed by the caulking portion 28, so as to control the axial force to be applied on the hub 4*d* due to the caulking. However, in this publication, the dimensions of each of the constituent parts of the hub for minimizing the contraction of a female spline at the inner end of the hub due to the caulking work are not specified. Note that in this publication, the thickness of the spline portion is not specified at all. Also in this publication, the position at which the caulking work starts is defined. However, this position is on the boarder position between a thick part and a thin part of the hub, and has the same structure as that disclosed in the above U.S. Pat. No. 540,732.

The rolling bearing unit 30 for driving the wheel as described above is combined with the transmission shaft 24 and the differential side constant velocity joint 26 to constitute a driving unit 34 for a wheel, as shown in FIG. 12. Out of these members, the differential side constant velocity joint 26 is coupled to an output portion of an unrepresented differential gear in a state that it is assembled in the car. Of the transmission shaft 24, the axially inner end portion is coupled to the basic end portion of the trunnion 27 which serves as an output portion of the differential side constant velocity joint 26, while the axially outer end portion is coupled to the constant velocity joint inner ring 15 which serves as an input portion of the wheel side constant velocity joint 2, respectively. The rotating force is transmitted by such a driving unit 34 for the wheel from the output portion of the differential gear to the drive wheel supported by the hub 4*b*, thereby rotating and driving this drive wheel.

In case of such a structure as shown in FIG. 8 to FIG. 12 above in which the inner ring 5 is fixed with respect to the hubs 4*a* to 4*d* by the caulking portion 28, the cost can be reduced by omitting the male screw portion 22 and the nut 23 from the structure shown in FIG. 7. Moreover, in this case, the size and the weight of the wheel driving rolling bearing unit 30, and consequently, those of the wheel driving unit 34 can also be reduced. Out of these members, the wheel driving rolling bearing unit 30 is provided closer to the wheel than a spring assembled in the suspension device to render a so-called unsprung load, so that a slight reduction of the weight can contribute to enhancement of the running performance centering on a riding comfort or running stability.

It is required to sufficiently maintain the strength of the caulking portion 28 for fixing the inner ring 5 to the hubs 4*a* to 4*d* for constituting the rolling bearing units 1*a*, 1*b* for the drive wheel, which is to be used for a long time.

Accordingly, a load required for forming this caulking portion 28 becomes considerably large even when such a method is employed in which a load to be applied during the processings such as a rocking caulking can be suppressed to be comparatively low. Thus, in this case, such load is applied as a thrust load which is directed outward in the axial direction onto the inner end portions of the hubs 4a to 4d. As a result, according to the experiments conducted by the present inventor, it has been found that, if no counter measure is taken, a part of the spline hole 13 (particularly, a part closer to the axially inner end) formed at the center of each of the hubs 4a to 4d is deformed, though slightly, inward in the radial direction.

More specifically, hitherto, when the cylindrical section provided in the axially inner end portion of each of the hubs 4a to 4d is processed to be the caulking portion 28, since this cylindrical section is caulked and expanded outward in the radial direction, the axially inner end of the spline hole 13 which is positioned in the vicinity of this caulking portion 28 is assumed to be deformed outward in the radial direction. However, the thrust load applied during the processing of the caulking portion 28 is large, as described above, so that an influence of a lateral distortion on this thrust load becomes larger than conventionally thought. As a result, the axially inner end portion of the spline hole 13 which is positioned in the vicinity of the caulking portion 28 is deformed inward in the radial direction, conversely, according to the findings of the present inventor. In any case, when even a part of the spline hole 13 is deformed inward in the radial direction, it becomes difficult to insert the spline shaft 17 into the spline hole 13, so that an assembling work of the rolling bearing unit 30 for driving the wheel is difficult to be conducted.

In order to facilitate the insertion of the spline shaft 17 into the spline hole 13 in spite of the deformation of the spline hole 13, it can be considered to sufficiently expand the inner diameter of this spline hole 13 to be larger than the outer diameter of the spline shaft 17, or to process the spline hole 13 for the second time after the processing of the caulking portion 28. Out of them, expansion of the inner diameter of the spline hole 13 may result in an increase of a backlash in a spline engagement portion between this spline hole 13 and the spline shaft 17, which may undesirably cause a conspicuous foreign sound or noise during when the automobile is driven. In addition, re-processing of the spline hole 13 may cause an increase of the manufacturing cost of the rolling bearing units 1a, 1b for the drive wheel, as another undesirable effect.

SUMMARY OF THE INVENTION

A rolling bearing unit for a drive wheel and a wheel driving unit of the present invention have been devised taking the above circumstances into consideration.

According to a first aspect of the present invention, there is provided a rolling bearing unit for a drive wheel comprising an outer ring, a hub, an inner ring, and a plurality of rolling elements, wherein:

said outer ring has a first flange to be coupled and fixed to a suspension device on an outer peripheral surface thereof, and a plurality of outer ring raceways on an inner peripheral surface thereof, respectively;

said hub has a spline hole in the center thereof, a second flange for supporting and fixing a drive wheel in a part closer to the outer end of an outer peripheral surface of the hub, a first inner ring raceway formed on an inner ring element integrally or separately formed with the hub in an intermediate portion of the outer peripheral surface, and a fit cylindrical surface section in a part closer to an axially inner end of the outer peripheral surface, respectively;

said inner ring has a second inner ring raceway on an outer peripheral surface thereof, with an axially inner end surface of said inner ring being pressed by a caulking portion formed by plastically deforming a cylindrical section formed in the axially inner end portion of said hub in a state that said inner ring is fitted on said cylindrical section, to be fixed to said hub;

said rolling elements are provided rotatably between said outer ring raceways and said first and second inner ring raceways, respectively; and the inner peripheral surface and the axially inner end surface of said inner ring are continuous by a chamfered portion having an convex arc-shaped cross section, said rolling bearing unit being characterized in that:

said cylindrical section is formed on the axially inner end portion of said hub in a part inner in the axial direction than the spline hole, and the inner end portion in the axial direction of this spline hole and the inner peripheral surface of the outer end portion in the axial direction of said cylindrical section are formed to be continuous by an inclined surface portion in a conical concave form which is inclined in a direction in which the diameter thereof becomes larger at an inner position in the axial direction; and the following condition is satisfied:

$$L \geq 30 \cdot (B/A) - 16,$$

where a distance between a boarder position between said inclined surface portion and the inner peripheral surface of said cylindrical section and the axially outer end portion of said chamfered portion is Lmm (a positive value when the boarder position is, in the axial direction, outside of said axially outer end portion), the thinnest part of the spline portion of the hub ((the outer diameter of the cylindrical section–the diameter of a groove bottom circle (that is, dedentum circle) of the spline)/2) is Amm, and the thickness of the hub at the boarder position between said inclined surface portion and the inner peripheral surface of said cylindrical section is Bmm.

Also, according to a second aspect of the present invention, there is provided a wheel driving unit comprising a differential side constant velocity joint which is coupled to an output portion of a differential gear, a transmission shaft with the axially inner end portion connected to an output portion of this differential side constant velocity joint, a wheel side constant velocity joint with an input portion connected to an axially outer end portion of this transmission shaft, and a rolling bearing unit for a drive wheel connected to an output portion of this wheel side constant velocity joint, characterized in that: this rolling bearing unit for the drive wheel is the rolling bearing unit for a drive wheel set forth in the first aspect above, and a spline hole which is formed on a hub for constituting this rolling bearing unit for the drive wheel and a spline shaft which is formed in the output portion of the wheel side constant velocity joint are brought into spline engagement.

According to the rolling bearing unit for the drive wheel and the wheel driving unit of the first and second aspects of the present invention, it is possible to insert the spline shaft into the spline hole easily without particularly enlarging the inner diameter of the spline hole or re-processing this spline hole after the formation of the caulking portion.

That is, an inclined surface portion is formed between the axially outer end portion of the cylindrical section for forming the caulking portion and the axially inner end portion of the spline hole, so as to properly regulate the boarder position between the cylindrical section and the inclined surface portion in accordance with the positional relationship with the outer end position of the chamfered portion provided on the inner ring. As a result, it is possible to suppress the deformation of the spline hole to the minimum irrespective of the load which is applied on the hub when the cylindrical section is plastically deformed in order to form the caulking portion.

DETAILED DESCRIPTION OF THE PREFERRED EMBODIMENTS

Figure 1:
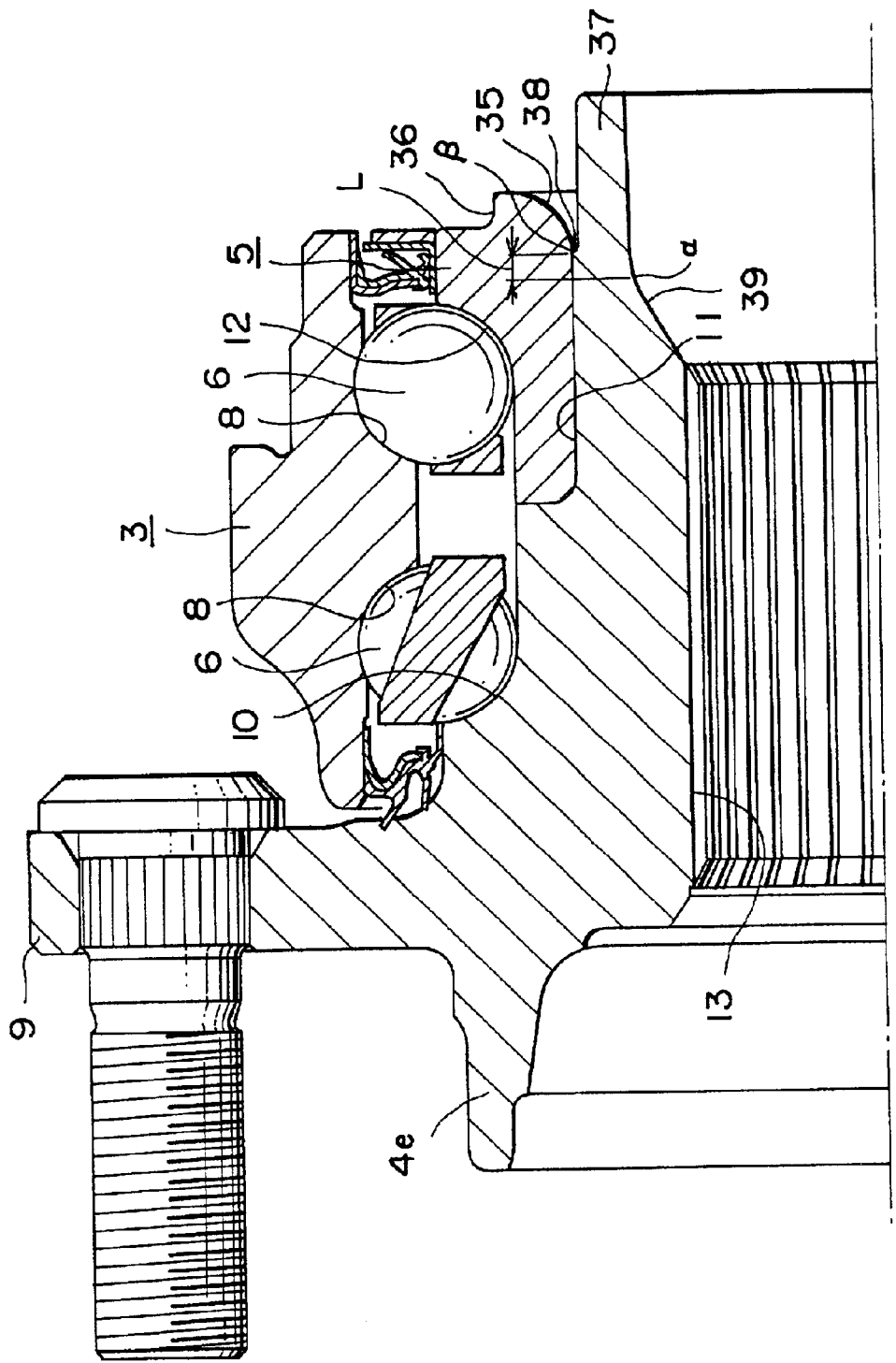
FIG. 1 is a cross-sectional view for showing a first embodiment of the present invention, cut by half, with a caulking portion in a state that it is not yet processed.
Figure 2:
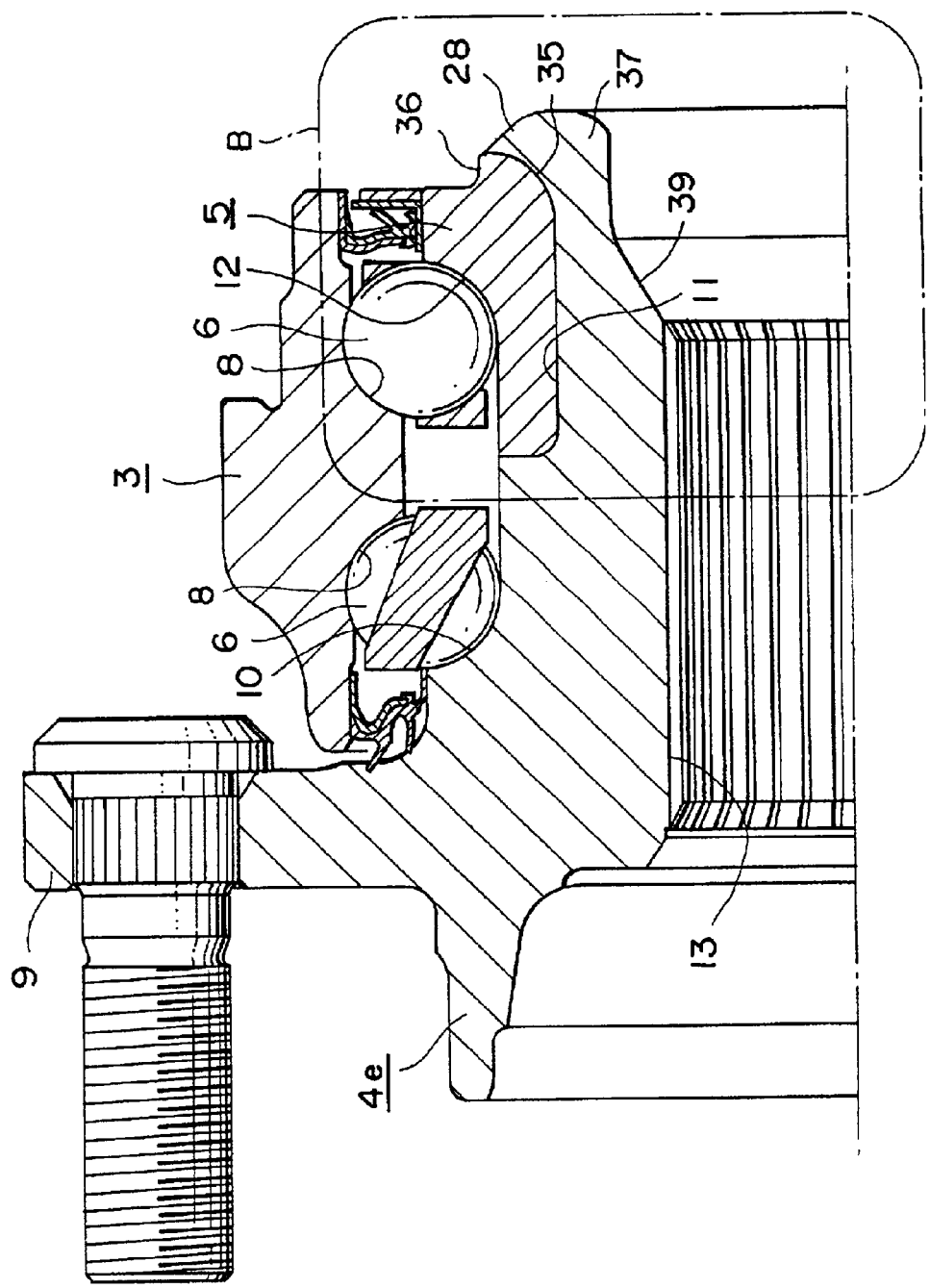
FIG. 2 is a cross-sectional view for showing the same embodiment, cut by half, with the caulking portion in a state that it has been processed.
Figure 8:
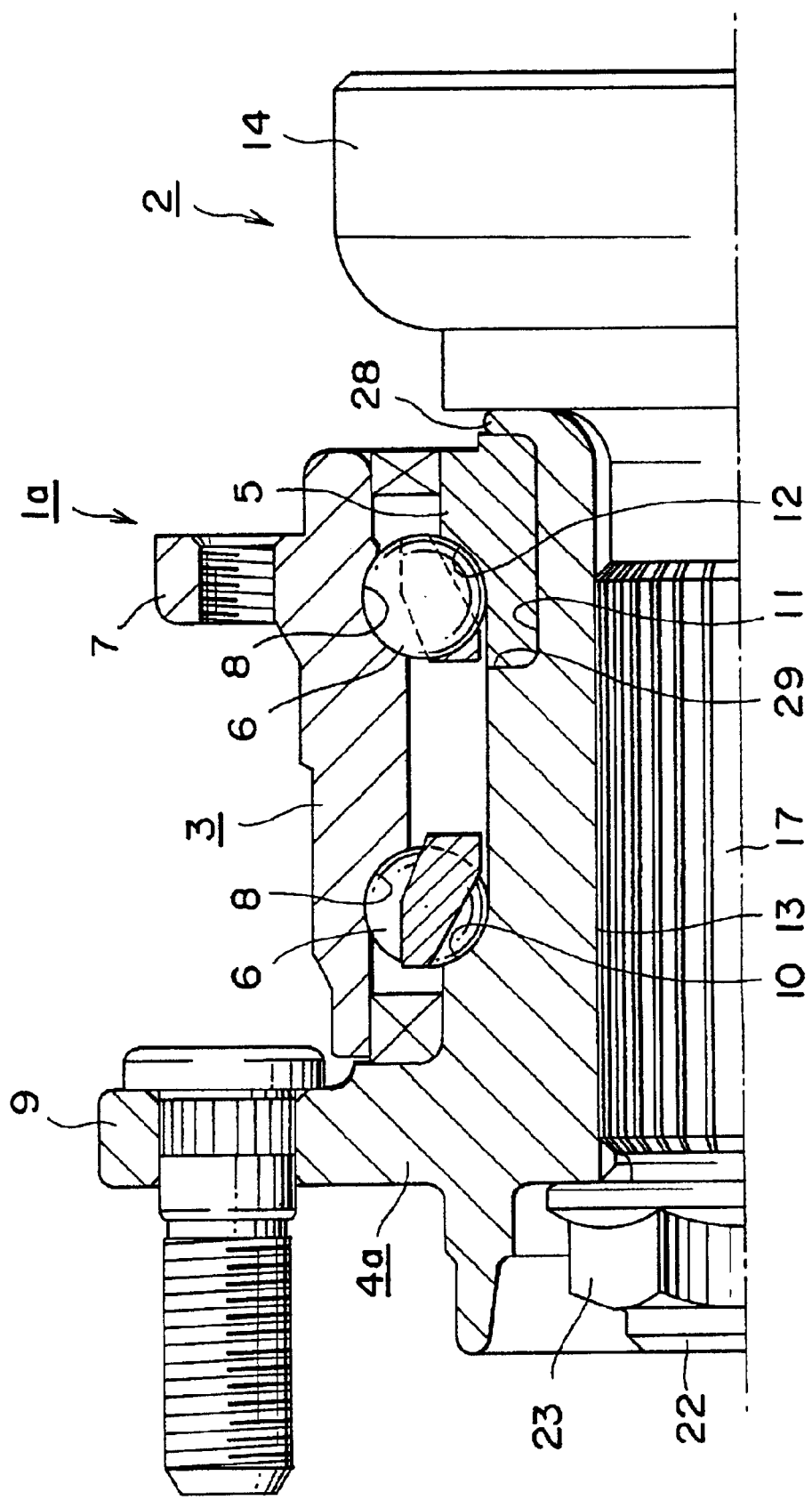
FIG. 8 is a cross-sectional view for showing a second example of the conventional structure, cut by half.
Figure 9:
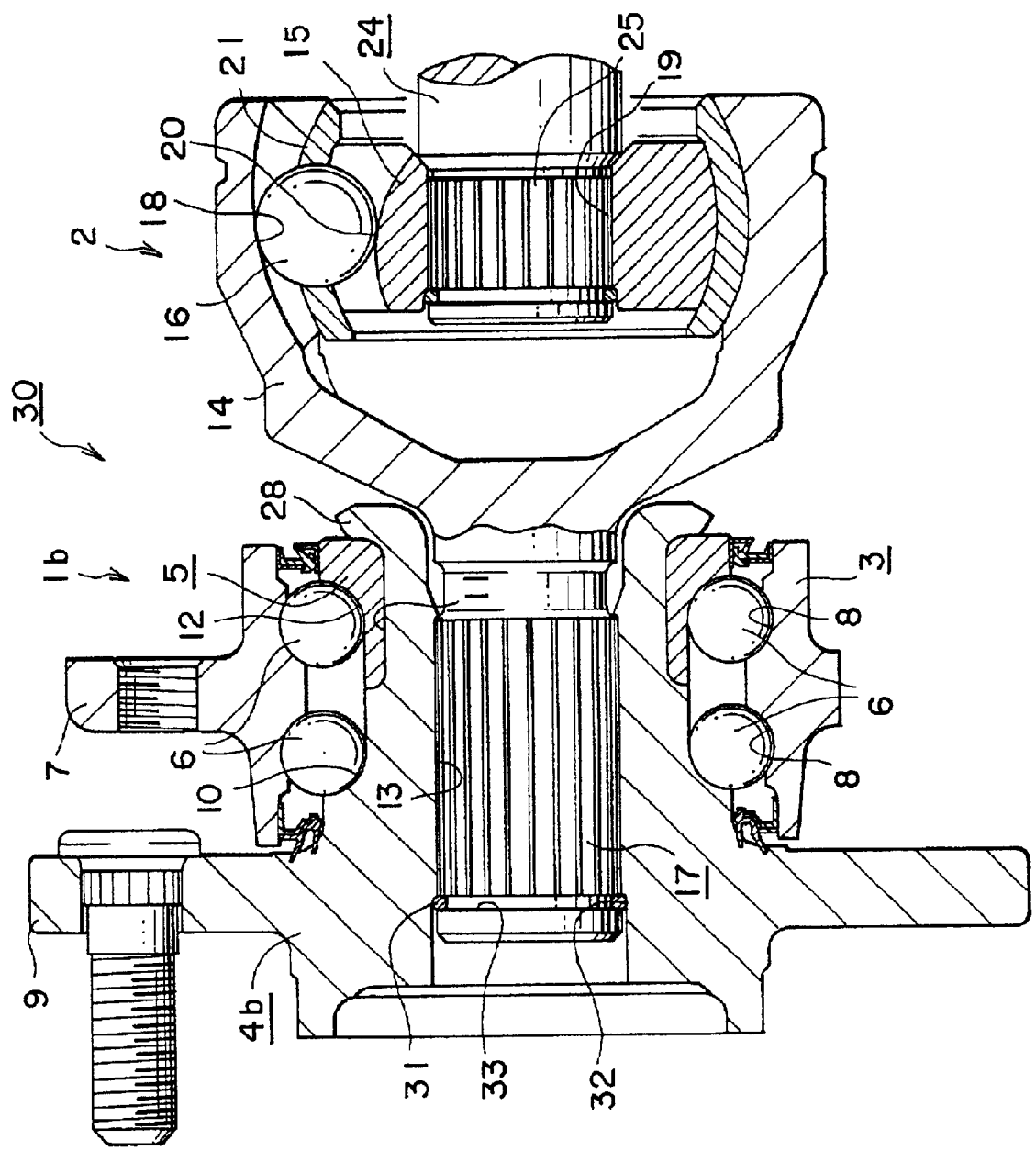
FIG. 9 is a cross-sectional view for showing a structure improved on the above second example.
Figure 10:
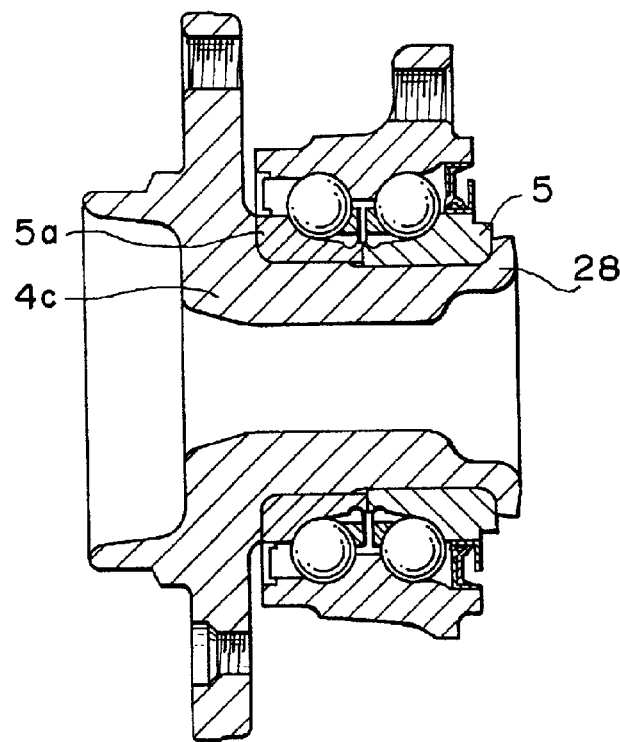
FIG. 10 is a cross-sectional view for showing an improvement on a third example of the conventional structure.
Figure 11:
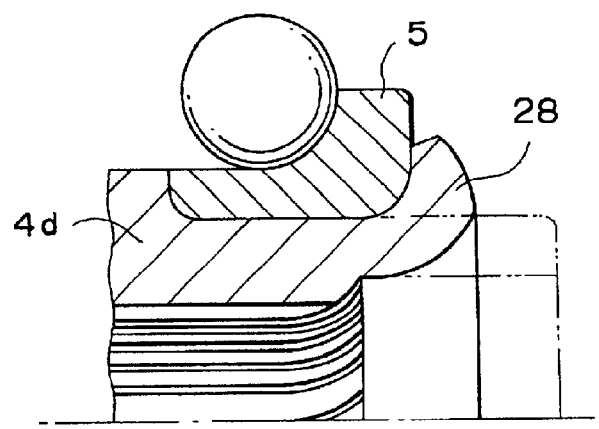
FIG. 11 is a cross-sectional view for showing an improvement on a fourth example of the conventional structure.
Figure 12:
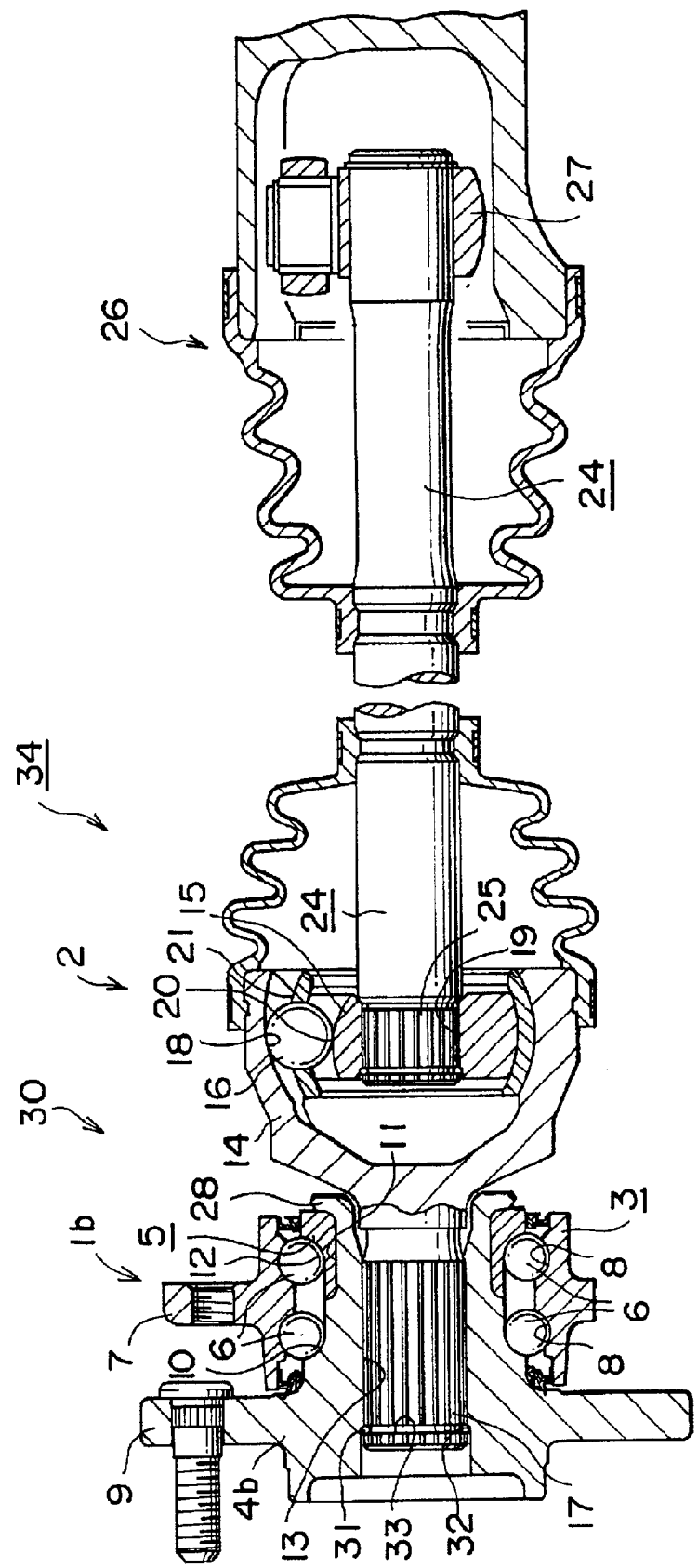
FIG. 12 is a cross-sectional view for showing a wheel driving unit in which the above improved structure is assembled.

FIGS. 1 to 3 show the first embodiment according to the present invention. Note that the present invention is characterized in that, when a caulking portion 28 is formed in an axially inner end portion of a hub 4e in order to press the axially inner end surface of an inner ring 5 which is fitted on a small diameter stepped portion 11 of the inner end portion of the hub 4e, much consideration is given to the form of this hub 4e in order to prevent deformation of a spline hole 13 which is formed at the center of this hub 4e. The basic arrangements and functions of the other portions are the same as those in the second example of the conventional structure shown in FIG. 8 above, or those in the improvements on this second example shown in FIGS. 9 to 12. Thus, the identical parts are given the same reference numerals and symbols and redundant description will be omitted or simplified. In the following, the present invention will be described centering on the characteristic arrangements thereof.

The inner peripheral surface and the axially inner end surface of the inner ring 5 are formed to be smoothly continues by a chamfered portion 35 which has a convex arc-shaped cross section. However, for the reason in processing, the inner peripheral surface of the inner ring 5 is ground after a curved surface of the convex arc-shaped section, which is to be formed as this chamfered portion 35, is machined or shaped by lathe, so that a tangent at the axially outer end position of this chamfered portion 35 is usually inclined by 10 to 20 degrees with respect to the central axis of the inner ring 5. Accordingly, the inclination of the tangent at the axially outer end position is discontinuous. The inner ring 5 is formed with a stepped portion 36 at a part in the axially inner end portion of the inner ring 5 positioned radially outside the chamfered portion 35, along the entire periphery thereof, and the thickness of this chamfered portion 35 in the radial direction is made smaller than that of a part more outward than the chamfered portion. With this arrangement, it is possible to prevent the shape of the second inner ring raceway 12 formed on the outer peripheral surface of an intermediate portion of this inner ring 5 from being distorted, in spite of a large force applied outward in the radial direction on the axially inner end portion of the inner ring 5 upon formation of the caulking portion 28.

In order to form the caulking portion 28, a cylindrical section 37 formed in the axially inner end portion of the hub 4e is arranged to have a cylindrical outer peripheral surface and a tapered inner peripheral surface slightly inclined (for example, the generating line is inclined with respect to the central axis by about 0 to 5 degrees) in a direction in which the inner diameter becomes larger at a position closer to the axially inner end opening. It is suffice for the outer peripheral surface of the above cylindrical section 37 if it takes a substantially cylindrical surface form. This surface may be formed as a tapered surface slightly inclined. When this surface is a tapered surface, the direction of inclination thereof is not counted (the surface may be inclined in any direction). Note that, in the illustrated structure, a stepped portion 38 having a concave arc-shaped cross section is formed at a boarder position between the outer peripheral surface of the cylindrical section 37 and the outer peripheral surface of a small diameter stepped portion 11 for fitting the inner ring 5 thereon, so as to provide a slight difference (of about 0.01 to 0.5 mm, for example) between the both outer peripheral surfaces. This stepped portion 38 is provided to serve as the reference point for deformation when the cylindrical section 37 is plastically deformed outward in the radial direction in order to form the caulking portion 28, so as to smoothly process the cylindrical section 37 to make the caulking portion 28 without generating defects such as a crack or a large void. To this end, it is arranged such that the axial position of the boarder position between the stepped portion 38 and the small diameter stepped portion 11 substantially matches the axial position of the axially outer end position of the chamfered portion 35. Also, the outer periphery of the tip end surface (axially inner end surface) of the cylindrical section 37 is chamfered so that damages such as a crack are hardly generated on this outer periphery, in spite of the force in the direction of tension applied on this outer periphery in the course of the above processing.

An inclined surface portion 39 in a conical concave shape is formed between the outer end portion in the axial direction of the inner peripheral surface of the cylindrical section 37 as described above and the inner end portion in the axial direction of the spline hole 13 formed in the center of the hub 4e. This inclined surface portion 39 takes a conical concave shape which is inclined in a direction in which the diameter thereof becomes larger at a position more inward in the axial direction. The generating line of this inclined surface portion 39 is inclined more largely with respect to the central axis of the hub 4e than the inner peripheral surface of the cylindrical section 37 (for example, by 20 to 70 degrees, and more preferably 25 to 65 degrees).

Figure 3A:
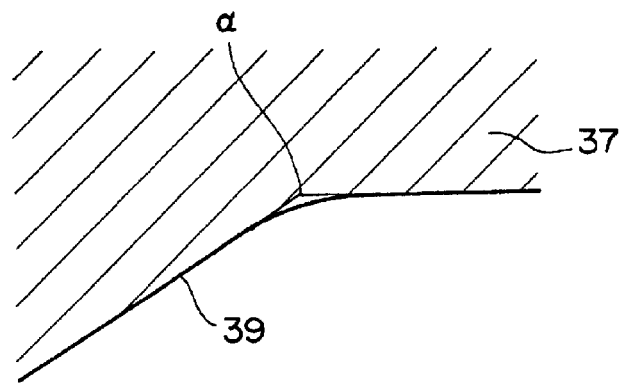
FIG. 3A is an enlarged view of a part in FIG. 1, for explaining the concept of a boarder position between an inclined surface portion and an inner peripheral surface of a cylindrical section.
Figure 3B:
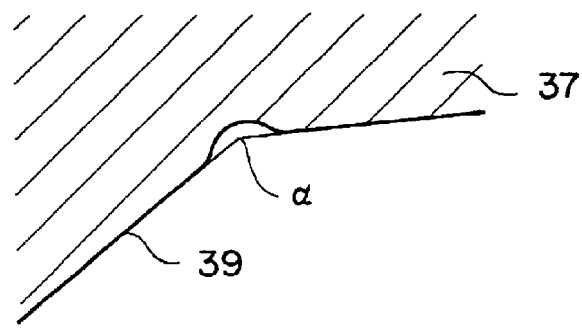
FIG. 3B and FIG. 3C are modifications of FIG. 3A, respectively.

The present invention is characterized by satisfying the following condition:

$$L \geq 30 \cdot (B/A) - 16,$$

where a distance between a boarder position between the inclined surface portion and the inner peripheral surface of the cylindrical section and the axially outer end portion of the chamfered portion is Lmm (which is a positive value when the boarder position is axially outside of the axially outer end portion of the chamfered portion), the thinnest part of the spline portion of the hub ((the outer diameter of the cylindrical section−the diameter of a dedendum circle (that is, groove bottom circle) of the spline)/2) is Amm, and the thickness of the hub at the boarder position between said inclined surface portion and the inner peripheral surface of said cylindrical section is Bmm. Note that at the boarder position between the inclined surface portion 39 and the axially outer end portion of the inner peripheral surface of the cylindrical section 37, there is often provided a continuous portion having an arc-shaped cross section called the corner R, as shown in FIG. 3A, or a concave groove called an escape, as shown in FIG. 3B. In such a case, the boarder position α is a position at which a line extended from the generating line of the inclined surface portion 39 intersects with a line extended from the generating line of the inner peripheral surface of the cylindrical section 37. Note that, in the illustrated structure, the inner end portion in the axial direction of the spline hole 13 and the axially outer end portion of the inner peripheral surface of the cylindrical section 37 are formed to be continuous through the inclined surface portion 39 in the continuous conical concave surface form, with the angle of inclination unchanged. On the other hand, it is also possible to form another structure in which, for instance, a cylindrical surface portion having the diameter larger than that of the spline hole 13 and smaller than the inner diameter of the cylindrical section 37 is formed between the inner end portion in the axial direction of the spline hole 13 and the axially outer end portion of the inner peripheral surface of the cylindrical section 37, so that the inclination of the inclined surface portion having the conical concave surface form is not uniform.

Figure 3C:
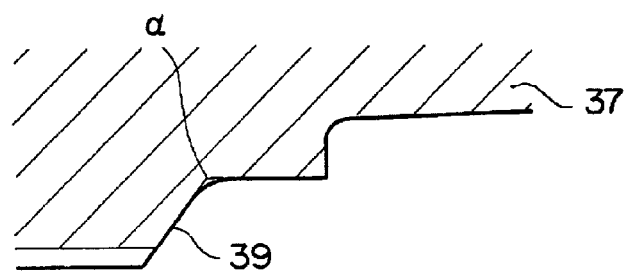

Also, the inclination surface portion may be formed as a surface perpendicular to the central axis of rotation of the hub. When a plurality of cylindrical surfaces are formed in the inner end portion of the hub in the axial direction, as shown in FIG. 3C, the position of intersection between an inclined surface portion extended inward in the axial direction from the inner end in the axial direction of a female spline portion of the hub and the axially outermost cylindrical surface is defined as the boarder position α, and the thickness of the hub at this boarder as Bmm.

According to the rolling bearing unit for the drive wheel of the present invention having the above structure, a spline shaft 17 (see FIGS. 7 to 9 and FIGS. 11 and 12) can be easily inserted into the spline hole 13 without particularly enlarging the inner diameter of the spline hole 13 or re-processing the spline hole 13 after formation of the caulking portion 28. More specifically, the above inclined surface portion 39 is provided between the axially outer end portion of the cylindrical section 37 for forming the caulking portion 28 and the axially inner end portion of the spline hole 13, so as to appropriately control the boarder position α between the cylindrical section 37 and the inclined surface portion 39 in accordance with the positional relationship with the axially outer end portion β of the chamfered portion 35 provided on the inner ring 5 ($L \geq 30 \cdot (B/A) - 16$). As a result, deformation of the spline hole 13 can be suppressed to the minimum in spite of the load applied on the hub 4e when the cylindrical section 37 is plastically deformed in order to form the caulking portion 28.

With respect to this point, experiments were made with hub units of various dimensions which were made as trial products, in order to obtain the optimal dimensions to minimize the deformation of the female spline of the hub by caulking.

Figure 5A:
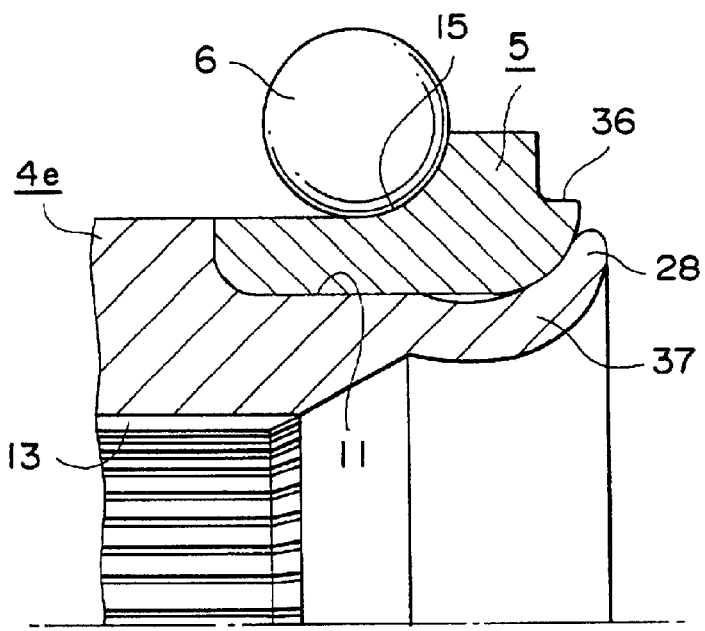
FIG. 5A is a cross-sectional view of a part corresponding to the part B shown in FIG. 2, for showing a state that the outer half of the cylindrical section is deformed inward in the radial direction upon formation of the caulking portion in an exaggerated manner.
Figure 5B:
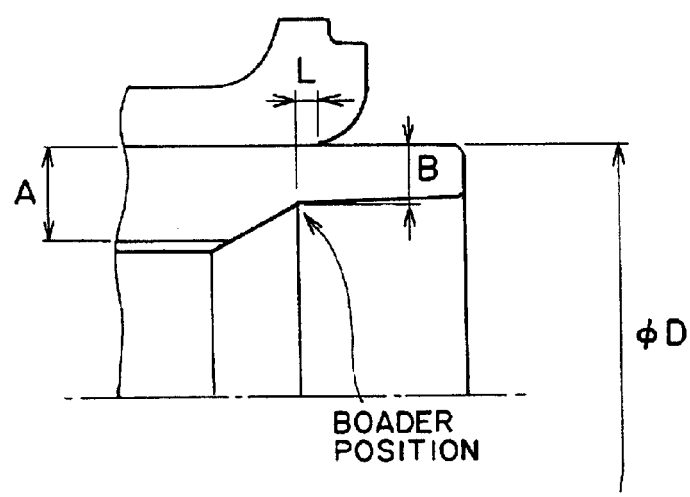
FIG. 5B is a schematic view for explaining the definitions of dimensions A, B and L.

Referring to FIG. 5B, hub units each having the inner ring with the inner diameter φD (the outer diameter of the hub) of φ30 mm to φ48 mm were produced as trial units of the hub units which are normally used in cars for private and commercial uses, and subjected to caulking experiments.

Figure 4:
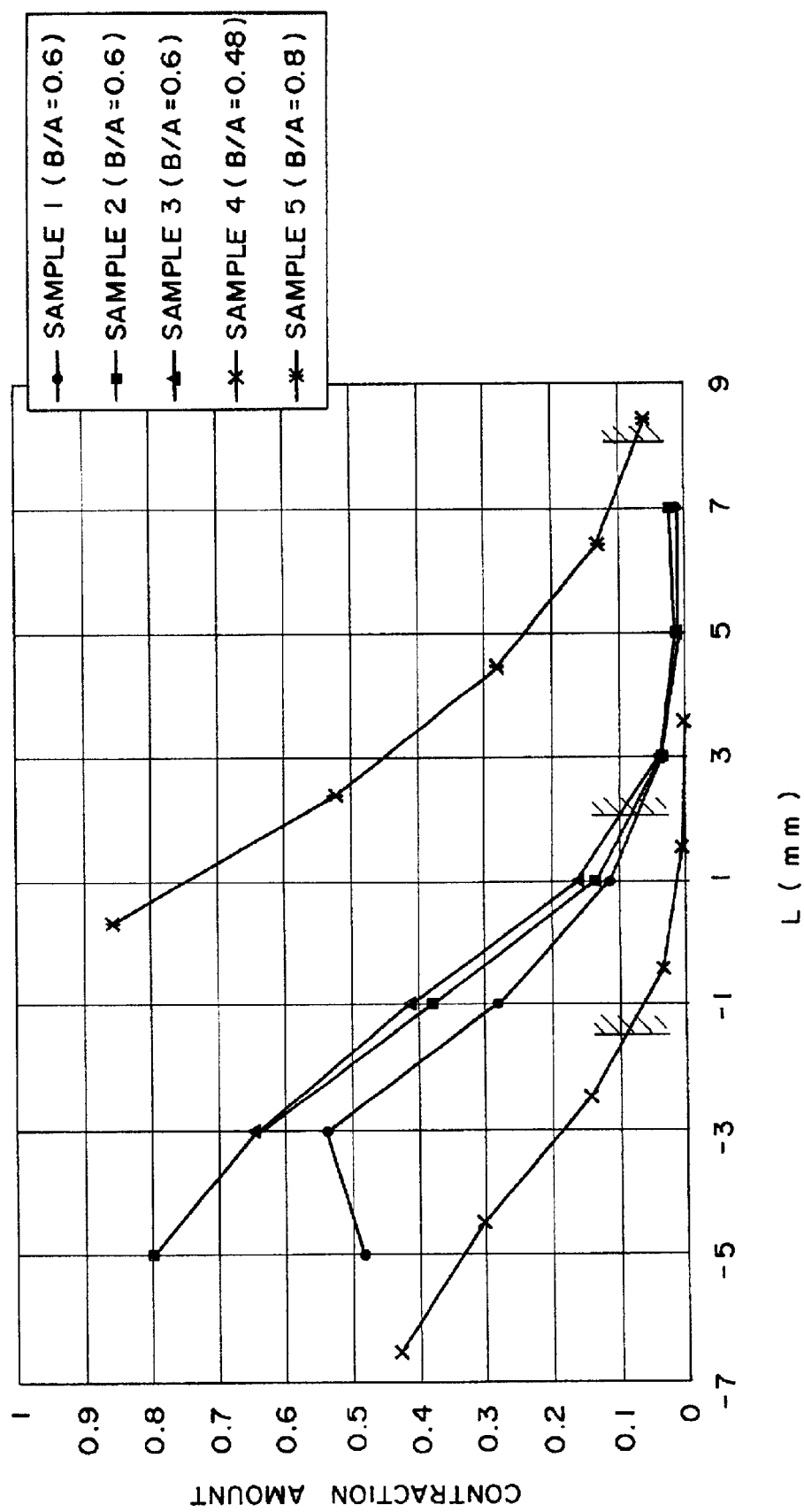
FIG. 4 is a graph for showing the relationship between the axial position of the border between the inclined surface portion and the inner peripheral surface of the cylindrical section and an amount of deformation of a spline hole upon processing of the caulking portion.

FIG. 4 shows results of measurement of an amount of radially inward displacement of the axially inner end portion of a female spline at the axially inner end of the hub after caulking (hereinafter called the "contraction amount"). The size D of the sample 1 is φ30 mm, the size D of the sample 2 is φ40 mm, and the size D of the sample 3 is φ48 mm. However, according to the graph shown in FIG. 4, though the sizes D of the respective samples are different from each other, the graph curves of the samples 1 to 3 can be approximated to be on the same line. All of the values for B/A of the samples 1 to 3 turn to 0.6, and when the caulking experiments were conducted with trial products of the sample 4 and the sample 5 having different values for B/A, the sample 4 and the sample 5 are represented by different graph curves.

It is found from the above description that a curve of the contraction amount of the spline depends on L and B/A. With respect to the definitions of A, B and L, the distance between the boarder position between the inclined surface portion and the inner peripheral surface of the cylindrical section and the axially outer end position of the chamfered portion is Lmm (which takes a positive value when the boarder position is disposed in the axial direction, outside of the axially outer end position of the chamfered portion), the smallest thickness of the spline portion of the hub ((the outer diameter size of the cylindrical section−the diameter of the groove bottom circle (or dedendum circle) of the spline)/2) is Amm, and the thickness of the hub at the boarder position between the inclined surface portion and the inner peripheral surface of the cylindrical section is Bmm, as shown in FIG. 5B, According to the graph shown in FIG. 4, it is found that the contraction amount of the axially inner end of the spline is drastically decreased when the dimension L exceeds a specific value, irrespective of a value of B/A. The point at which the contraction amount starts to drastically decrease is indicated in the graph by "the hatching leftward down". It is also found that the relation between this point (dimension L) and a value for B/A is expressed as follows:

$$L=30 \cdot (B/A)-16.$$

Consequently, though B/A may be required to have a different value, depending on the size of the hub unit, it is possible to minimize the contraction of the axially inner end of the female spline of the hub if design is made to satisfy the following condition:

$$L \geq 30 \cdot (B/A)-16.$$

As described above, if the distance L is set within the above range, an amount of deformation of the spline hole 13 upon formation of the caulking portion 28 can be suppressed to the minimum. For this reason, it is possible to suppress a backlash in the spline engagement portion between the spline hole 13 and the spline shaft 17 to the minimum without subjecting the spline hole 13 to re-processing after processing of the caulking portion 28 even if the inner diameter of this spline hole 13 is not set unnecessarily large with respect to the outer diameter size of the spline shaft 17.

The inner ring and the hub prior to the caulking are usually fitted to each other with an interference of about 10 to 35 mm therebetween. However, it is found that, if the caulking process is conducted when a value for B/A is 0.8, a gap is generated between the fit surfaces between the inner ring 5 and the hub 4*e*, as shown in FIG. 5A. When the gap is generated between the fit surfaces, a creep (slip) of the inner ring is easily generated during the driving, which phenomenon is required to be prevented.

It is found that such a phenomenon occurs only on condition that a value for B/A is large (exceeding 0.6) and that L exceeds 5 mm even if B/A is not more than 0.6.

Accordingly, in case of B/A>0.6 and in case of L>5, it is possible to prevent a gap from being generated between the fit surfaces if a metal mold for caulking is brought into contact not only with the end surface, but also with the inner diameter surface to carry out the caulking work.

Figure 6:
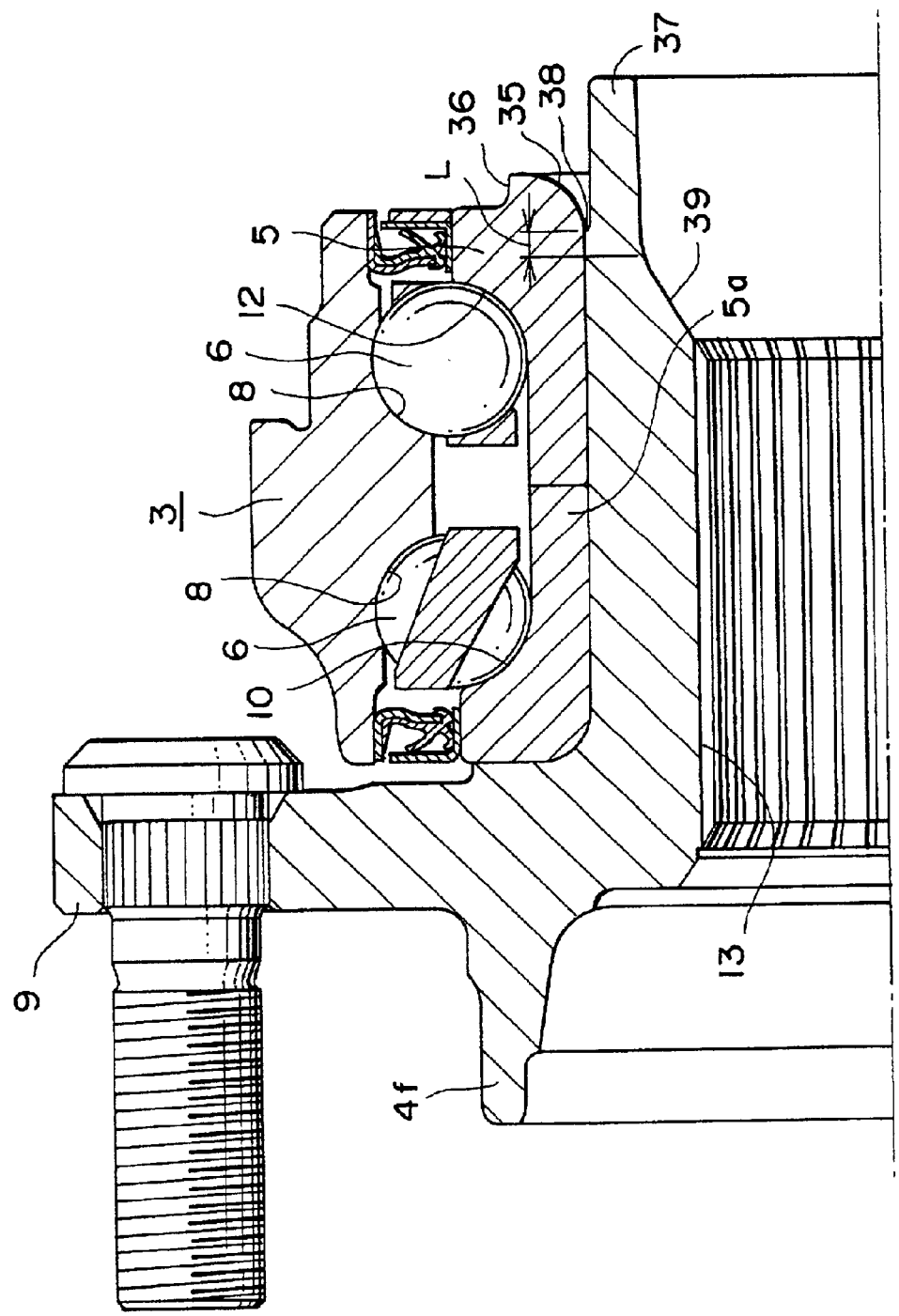
FIG. 6 is a view for showing a second embodiment of the present invention, in the same manner as FIG. 1.
Figure 7:
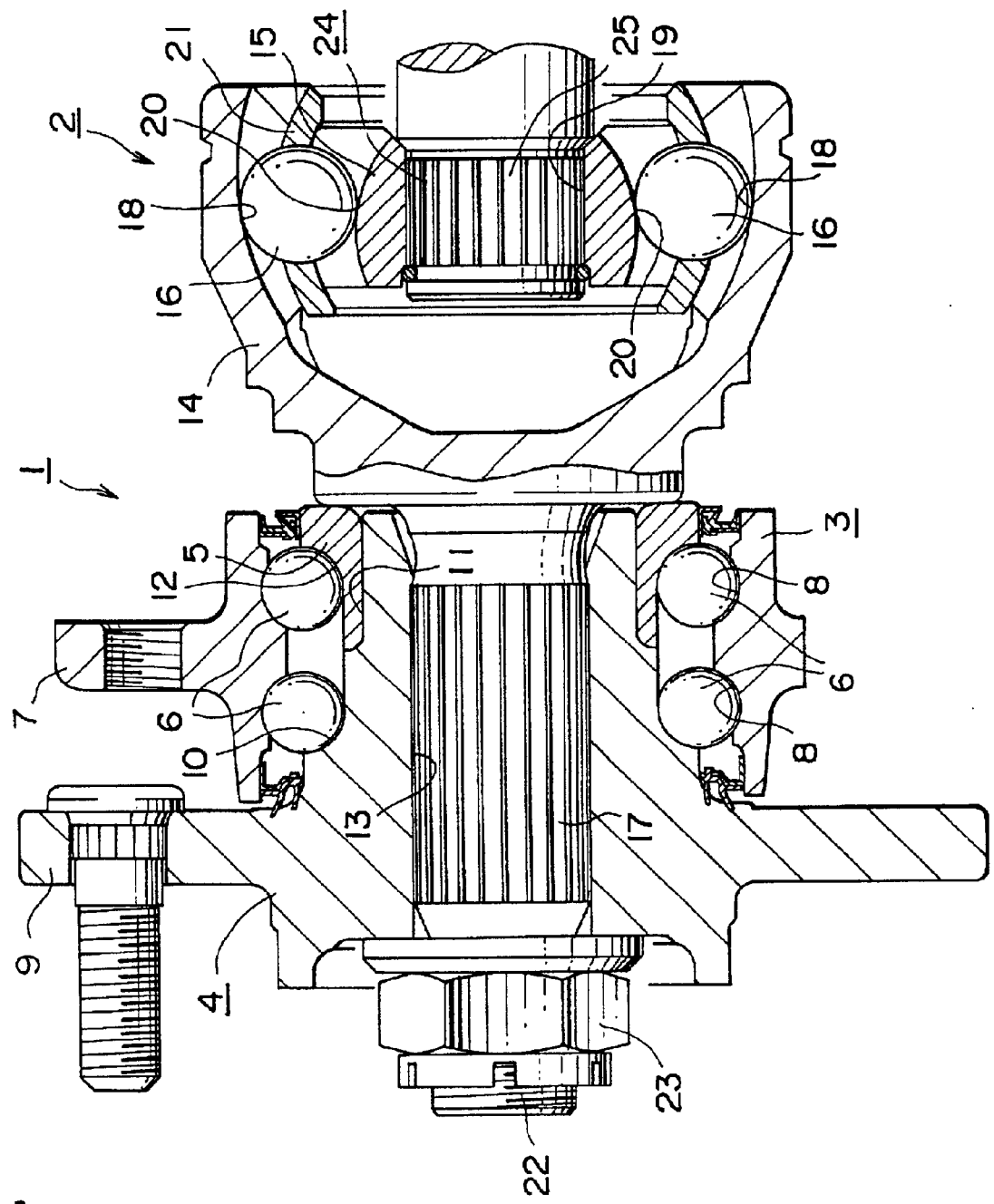
FIG. 7 is a cross-sectional view for showing a first example of a conventional structure.

Next, FIG. 6 shows a second embodiment of the present invention. In case of the structure of the first embodiment described above, the first inner ring raceway 10 is formed directly on the outer peripheral surface of the intermediate portion of the hub 4*f*. However, in case of the second embodiment, a separate inner ring element 5*a* which has a first inner ring raceway 10 formed on the outer peripheral surface thereof is fitted on the intermediate portion of the hub 4*f*. Then, the axially outer end surface of the inner ring 5 which has a second inner ring raceway 12 formed on the outer peripheral surface thereof is caused to abut on the axially inner end surface of the inner ring element 5*a*. Then, by the use of the caulking portion 28 (see FIG. 2) which is formed by plastically deforming the cylindrical section 37 formed in the axially inner end portion of the hub 4*f* outward in the radial direction, the inner ring 5 and the inner ring element 5*a* are fixed to the hub 4*f*. The arrangements and the functions of the other parts in the second embodiment are the same as those in the first embodiment described above.

Since the rolling bearing unit for the drive wheel and the wheel driving unit according to the present invention are arranged and function as described above, the structure which can contribute to the enhancement of the running performance in a small size and with a light weight can be realized at a lower cost.

What is claimed is:

1. A rolling bearing unit for a drive wheel comprising an outer ring, a hub, an inner ring, and a plurality of rolling elements, wherein:

said outer ring has, on the outer peripheral surface thereof, a first flange to be coupled and fixed to a suspension device, and on the inner peripheral surface thereof, a plurality of outer ring raceways;

said hub has a spline hole in the center thereof, a second flange for supporting and fixing a drive wheel in a part closer to the outer end of an outer peripheral surface of the hub, and a first inner ring raceway formed on an inner ring element integrally or separately formed with the hub in an intermediate portion of the outer peripheral surface;

said inner ring has a second inner ring raceway on the outer peripheral surface thereof;

said rolling elements are provided rotatably between said outer ring raceways and said first and second inner ring raceways, respectively;

the inner peripheral surface and the axially inner end surface of said inner ring are formed to be continuous by a chamfered portion having a convex arc-shaped cross section;

said hub has a cylindrical section formed on the axially inner end portion of said hub in a part inner in the axial direction than the spline hole, and the inner end portion in the axial direction of this spline hole and the inner peripheral surface of the outer end portion in the axial direction of said cylindrical section are continuous by an inclined surface portion in a conical concave form which is inclined in a direction in which the diameter thereof becomes larger at an inner position in the axial direction;

the following condition is satisfied:

$$L \geq 30 \cdot (B/A)-16,$$

where a distance between a border position between said inclined surface portion and the inner peripheral surface of said cylindrical section and the axially outer end portion of said chamfered portion is L mm (a positive value when the border position is, in the axial direction, outside of said axially outer end portion), the thinnest part of the spline portion of the hub (the outer diameter of the cylindrical section—the diameter of a groove bottom circle of the spline)/2) is A mm, and the thickness of the hub at the border position between said inclined surface portion and the axially inner peripheral surface of said cylindrical section is B mm;

said inner ring is fitted to said hub with the axially inner end surface being pressed by a crimping portion of the hub in the axially inner end portion of said hub; and said inner ring is fixed on said cylindrical section by crimping said cylindrical section.

2. A wheel driving unit comprising a differential side constant velocity joint which is coupled to an output portion of a differential gear, a transmission shaft with the axially inner end portion connected to an output portion of this differential side constant velocity joint, a wheel side constant velocity joint with an input portion connected to an axially outer end portion of this transmission shaft, and a rolling bearing unit for a drive wheel connected to an output portion of this wheel side constant velocity joint, characterized in that: the rolling bearing unit for the drive wheel is the rolling bearing unit for a drive wheel according to claim 1, and a spline hole which is formed on the hub for constituting this rolling bearing unit for the drive wheel and a spline shaft which is formed in the output portion of the wheel side constant velocity joint are brought into spline engagement.

* * * * *